US012683547B2

(12) United States Patent
Brottier et al.

(10) Patent No.: US 12,683,547 B2
(45) Date of Patent: Jul. 14, 2026

(54) PHOTOVOLTAIC AND THERMAL SOLAR PANEL

(71) Applicant: DUALSUN, Marseille Cedex (FR)

(72) Inventors: Laetitia Brottier, Marseilles (FR);
Jerome Mouterde, Marseilles (FR);
Remi Heutte, Marseilles (FR); **Seirigne
Sarr-Tagawa**, Marseilles (FR);
Valentin Delachaux, Marseilles (FR)

(73) Assignee: DUALSUN, Marseilles (FR)

( * ) Notice: Subject to any disclaimer, the term of this
patent is extended or adjusted under 35
U.S.C. 154(b) by 0 days.

(21) Appl. No.: 18/854,587

(22) PCT Filed: Feb. 13, 2023

(86) PCT No.: PCT/EP2023/053512
§ 371 (c)(1),
(2) Date: Oct. 7, 2024

(87) PCT Pub. No.: WO2023/217423
PCT Pub. Date: Nov. 16, 2023

(65) Prior Publication Data
US 2025/0357891 A1      Nov. 20, 2025

(30) Foreign Application Priority Data
May 12, 2022     (FR) .................................. FR2204522

(51) Int. Cl.
*H02S 40/42*         (2014.01)
*H02S 20/22*         (2014.01)

(52) U.S. Cl.
CPC ............ *H02S 40/425* (2014.12); *H02S 20/22*
(2014.12)

(58) Field of Classification Search
CPC ........ H02S 40/425; H02S 20/22; H02S 40/44;
F24S 25/20; F24S 2010/751;
(Continued)

(56) References Cited

U.S. PATENT DOCUMENTS 6,424,560 B2 * 7/2002 Nishii .................... G11C 15/04
365/49.1
7,055,589 B2 * 6/2006 Lee ...................... H01L 23/4093
165/185
(Continued)

FOREIGN PATENT DOCUMENTS

DE        202007008488 U1    11/2007
DE        102013211682 B4     4/2017
(Continued)

OTHER PUBLICATIONS

International Search Report issued on Apr. 19, 2023, in corresponding International Application No. PCT/EP2023/053512, 6 pages.

*Primary Examiner* — Michael Y Sun
(74) *Attorney, Agent, or Firm* — Maier & Maier, PLLC

(57)                    ABSTRACT

A hybrid solar panel including at least one single-piece section resulting from extrusion, the section including a wall forming the aforementioned bottom and top faces of the heat exchanger, and the section includes: a plurality of longitudinal fins extending substantially perpendicularly from the bottom face of the heat exchanger or from the aforementioned wall, and—at least one portion of the circulation pipe directly connected to the bottom face of the heat exchanger or to the aforementioned wall, the portion of the circulation pipe extending substantially parallel to the longitudinal fins.

13 Claims, 8 Drawing Sheets

(58) Field of Classification Search
CPC ........... F24S 2025/011; F24S 2025/016; F24S
2080/03; F24S 10/753; F28F 1/16; F28F
1/22; Y02E 10/50; Y02E 10/60
See application file for complete search history.

(56) References Cited

U.S. PATENT DOCUMENTS

2010/0012171 A1* 1/2010 Ammar ................... H10F 77/63
136/246
2012/0037210 A1* 2/2012 Lim .......................... F28F 3/02
136/246

FOREIGN PATENT DOCUMENTS

| | | | |
|---|---|---|---|
| EP | 2885822 | B1 | 9/2016 |
| NL | 2002448 | C2 | 7/2010 |
| WO | 2011/014120 | A2 | 2/2011 |
| WO | 2012/016678 | A1 | 2/2012 |

\* cited by examiner

[Fig. 1]
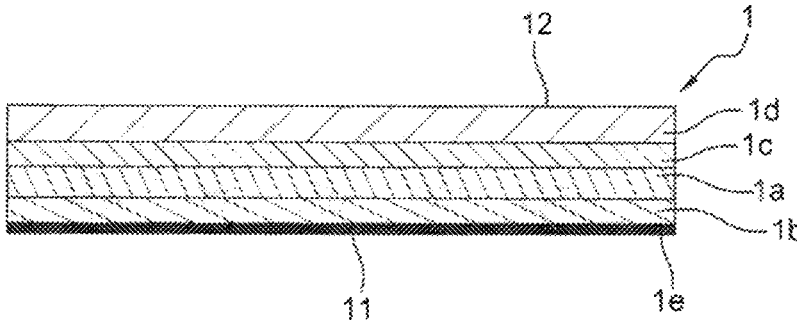
[Fig. 2]
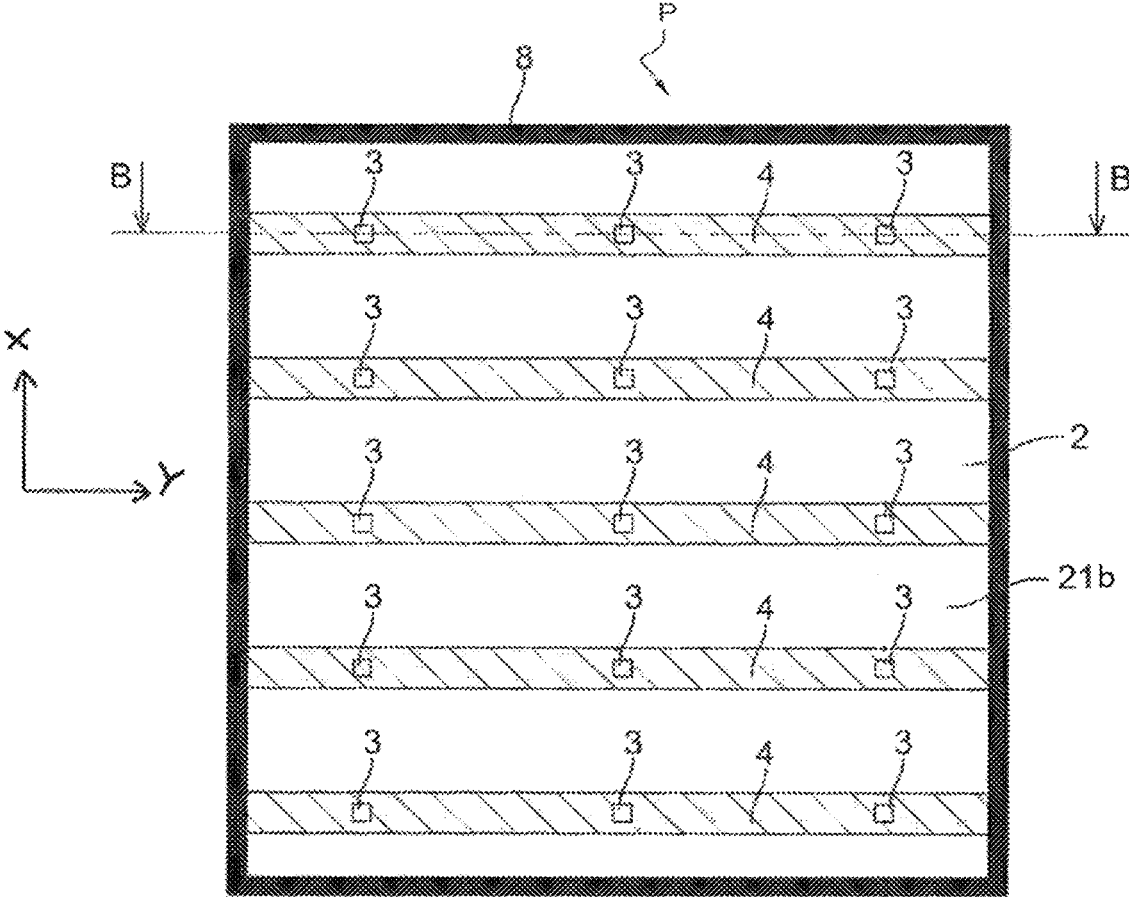

[Fig. 3]
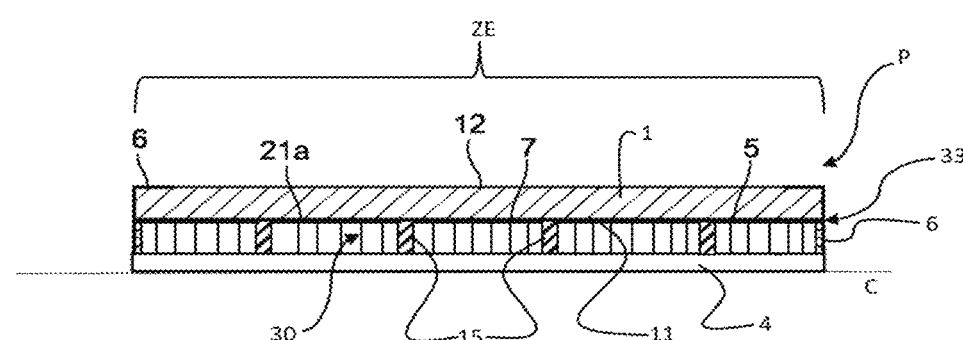
[Fig. 4]
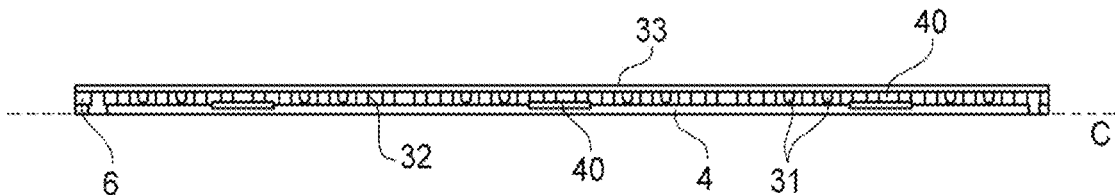
[Fig. 5]
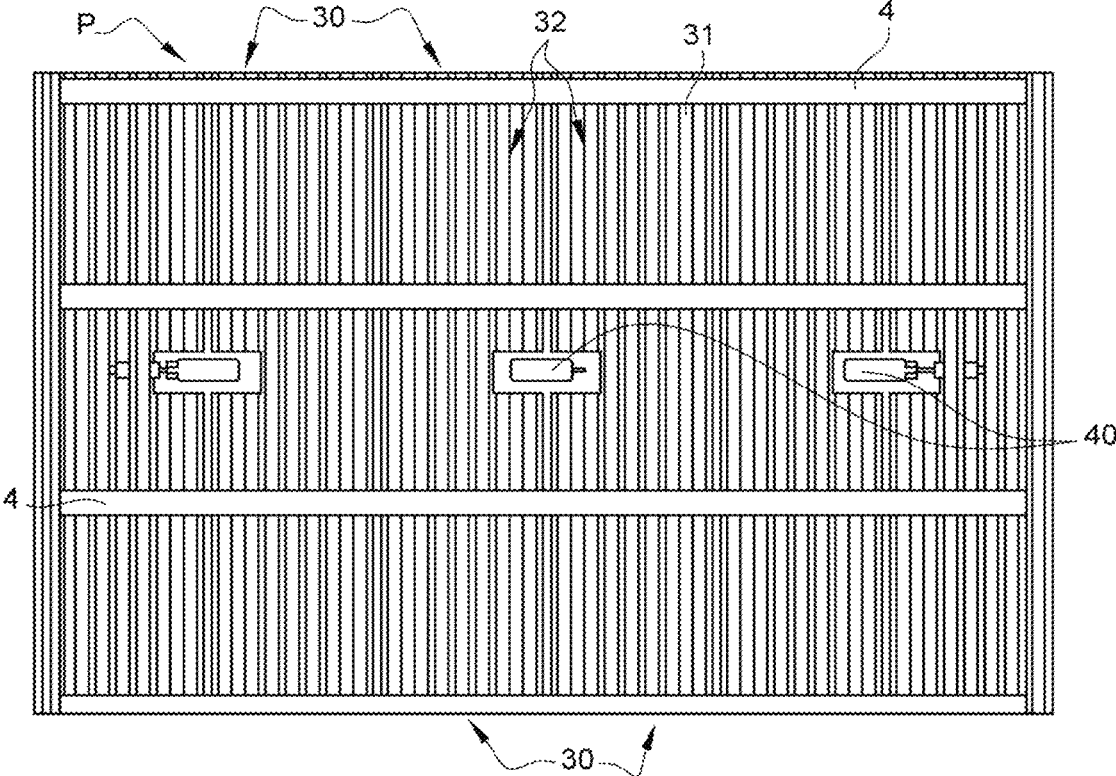

[Fig. 6]
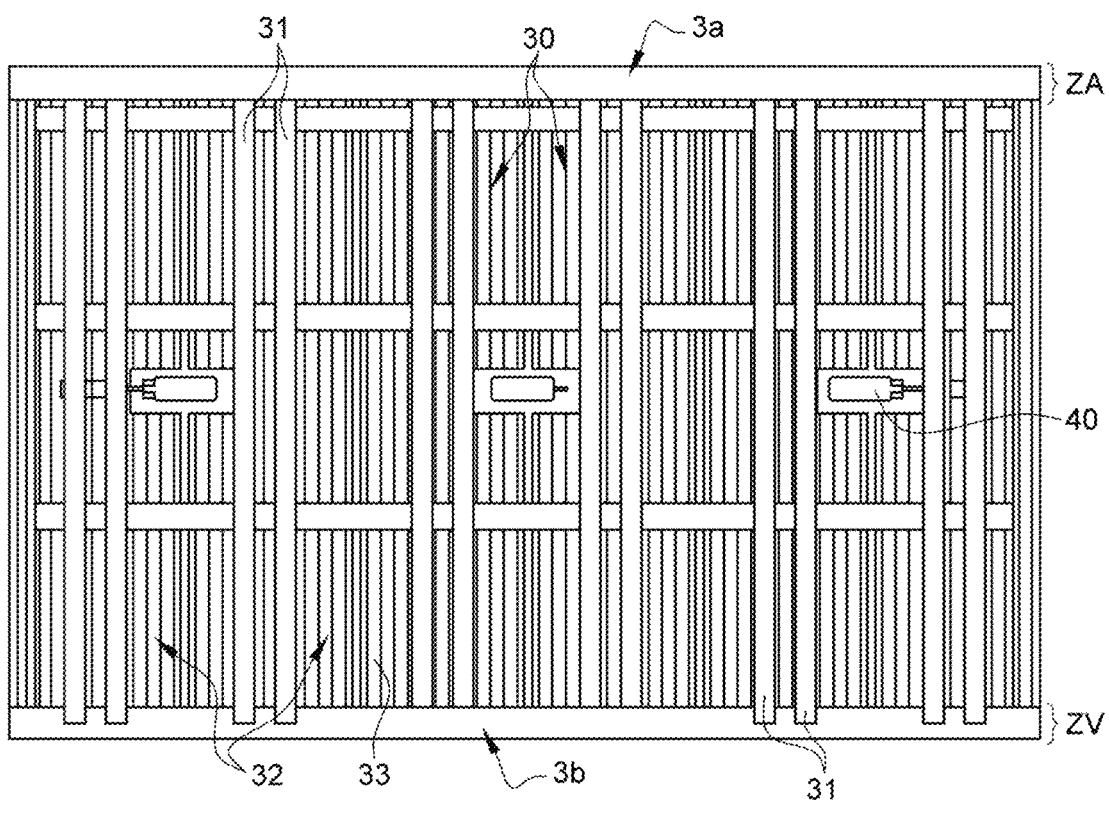

[Fig. 7]
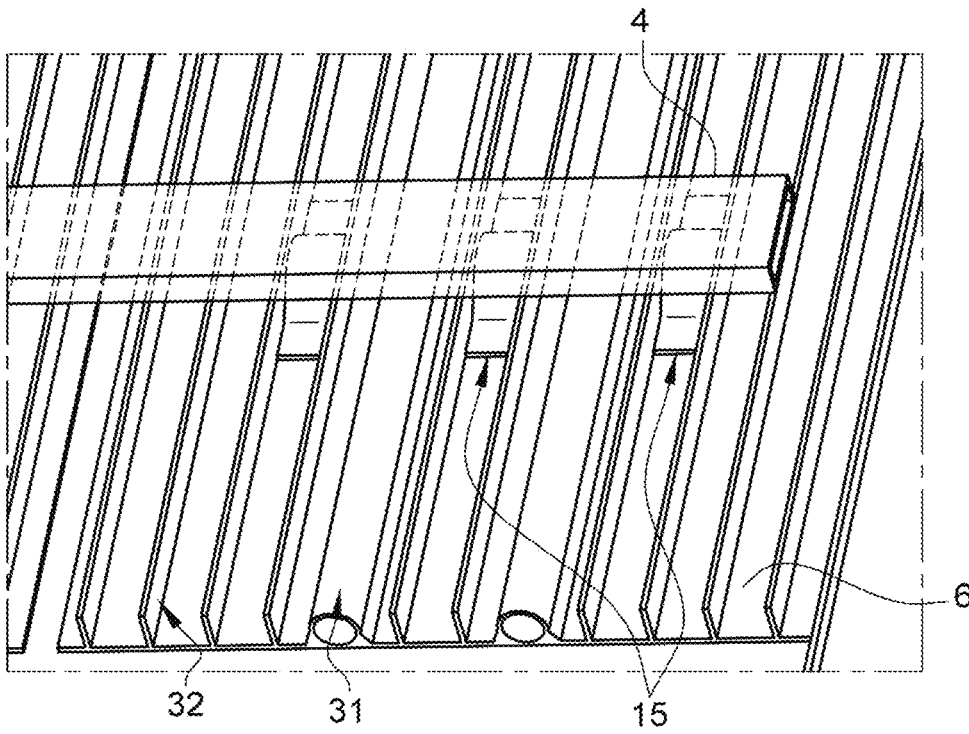
[Fig. 8a]
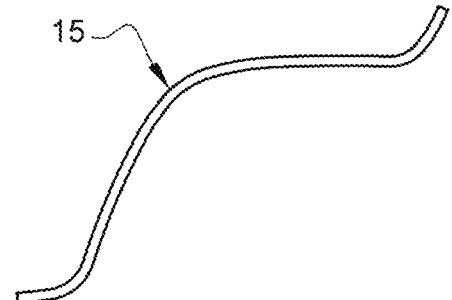

[Fig. 8b]
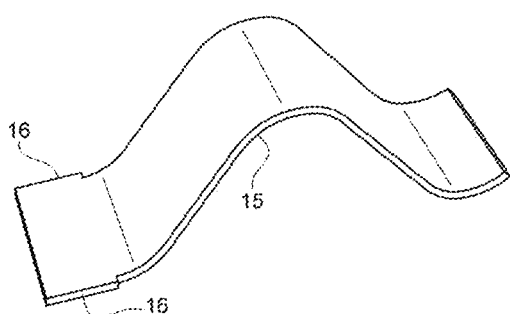
[Fig. 9]
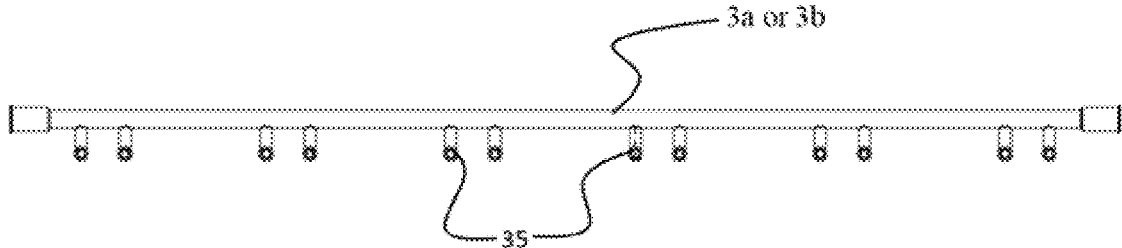

[Fig. 10]
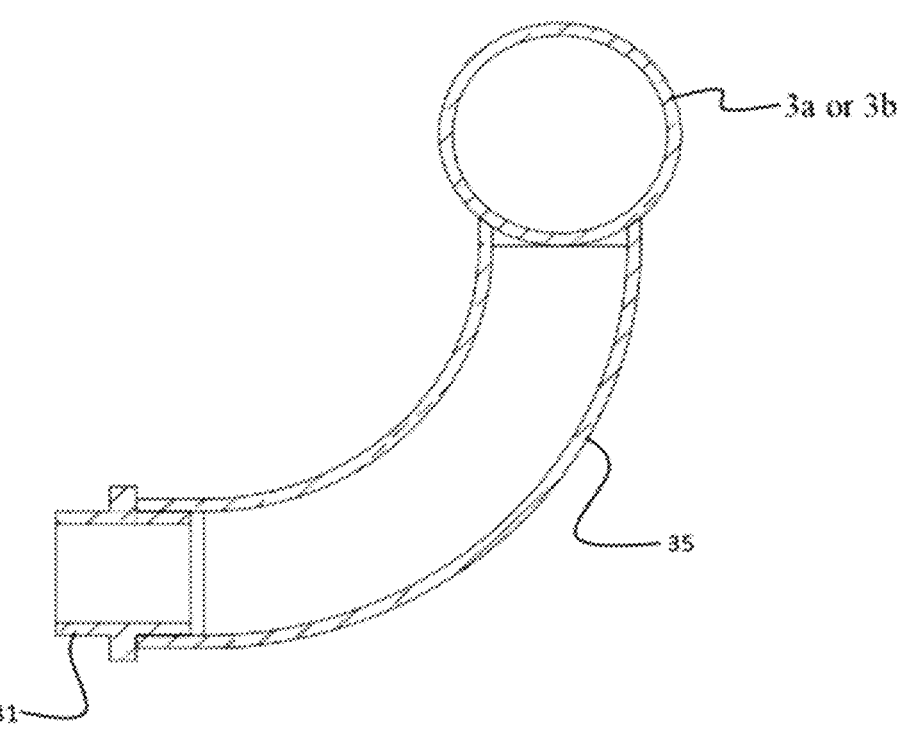
[Fig. 11]
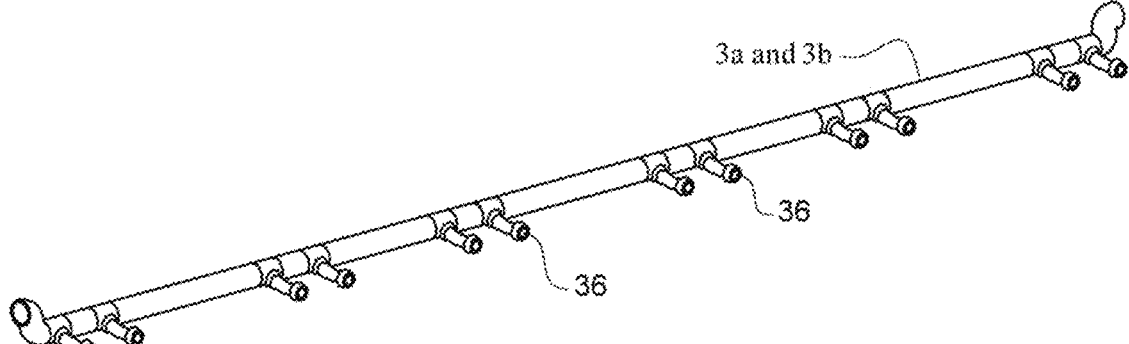

[Fig. 12]
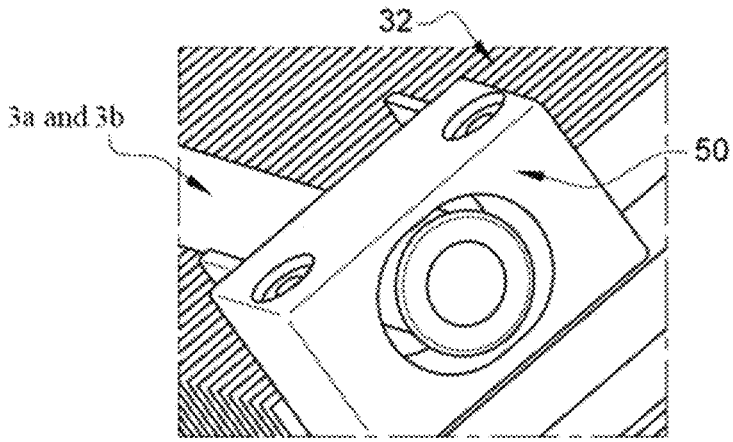
[Fig. 13]
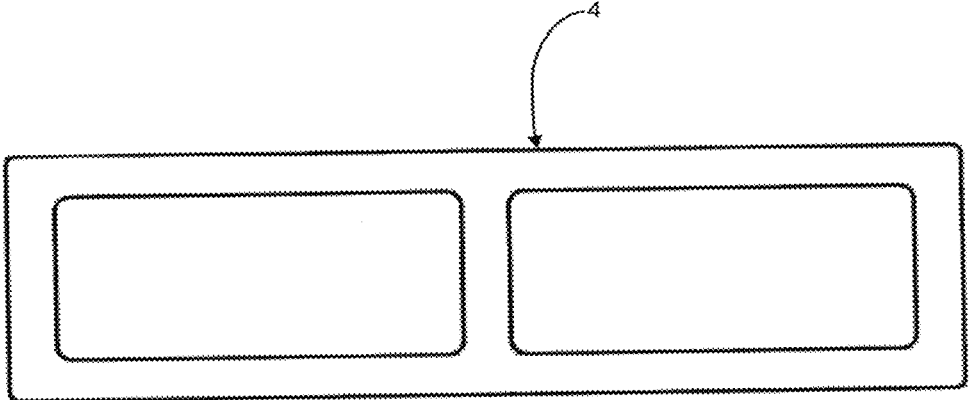

[Fig. 14]
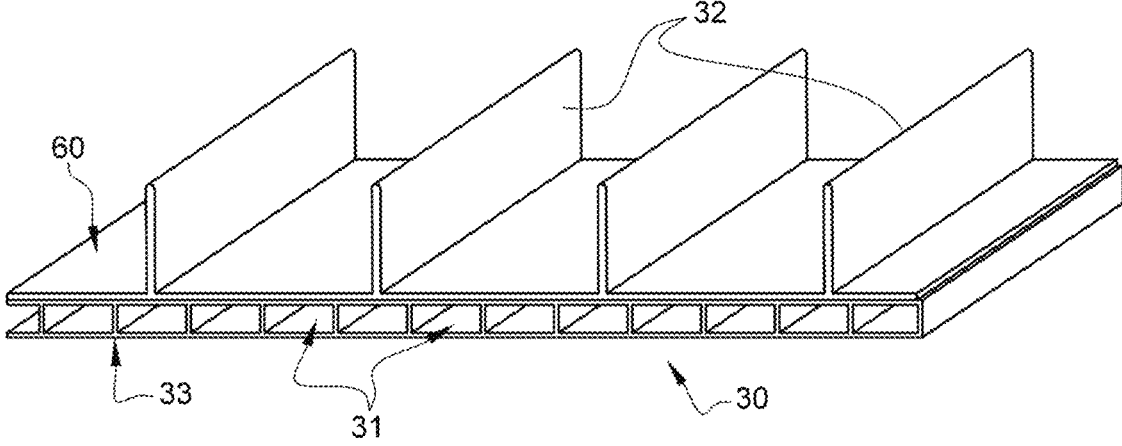
[Fig. 15]
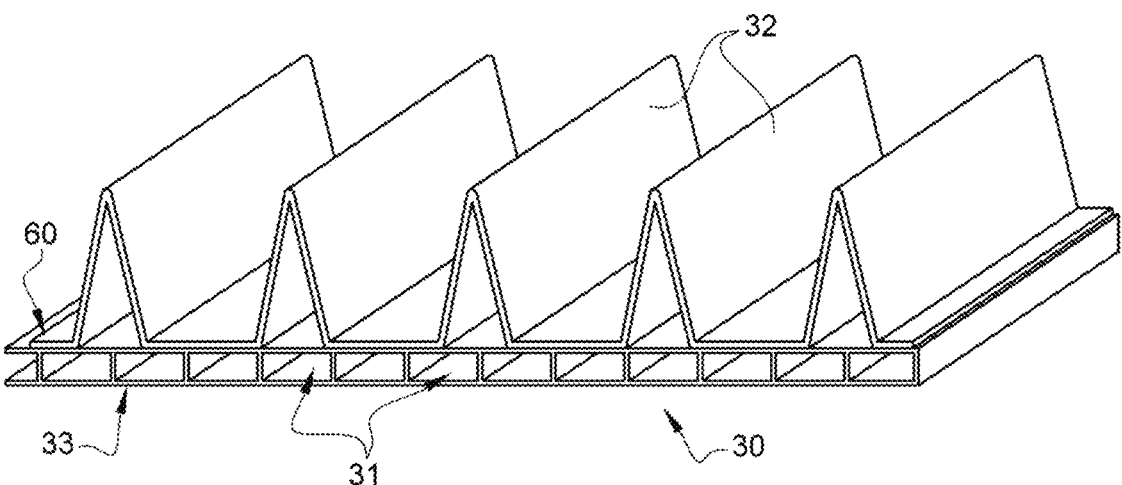

PHOTOVOLTAIC AND THERMAL SOLAR PANEL

TECHNICAL FIELD

The object of the present invention is a photovoltaic and thermal (hybrid) solar panel. The invention also relates to installing the heat exchanger of such a hybrid panel, this exchanger being particularly easy to install and to disassemble, in particular to replace defective parts.

The invention relates to the technical field of heat exchangers for the thermal control of hybrid solar panels. A hybrid solar panel operates both with photovoltaic sensors (for producing electricity) and with thermal sensors (for producing heat). On the top face of the panels, on the sun side, photovoltaic cells produce electricity from solar rays. On the bottom face, thermal solar sensors capture the heat emitted by the sun.

BACKGROUND

Photovoltaic solar panels make it possible to produce electrical energy from solar radiation. They comprise a plurality of photovoltaic elements (thin cells or layers) that operate according to the principle of photoelectrical effect.

Generally, a plurality of photovoltaic cells are connected together on a photovoltaic solar panel, and a plurality of panels are connected to create a solar installation. This installation produces electricity that can be consumed on site or supply a distribution network.

Photovoltaic solar panels convert only a relatively small part of the solar radiation into electricity, the remainder being unused heat. This heat is unfavourable to the electrical performance of the solar panels since it is possible to see a reduction in the efficacy of the photovoltaic elements with a temperature of approximately −0.45%/° C. This is why it is doubly advantageous to cool photovoltaic solar panels. This is because not only does the efficacy of the photovoltaic elements increase, but the cooling calories can be used in more or less complex heating systems. Hybrid solar panels are then spoken of, capable of simultaneously producing electrical energy and thermal energy.

Generally, a heat exchanger is disposed facing the rear face of the photovoltaic module so as to cool the latter.

The patent document WO 2012/069750 (Solaire 2G) proposes a hybrid solar panel composed of a heat exchanger comprising a heat exchange zone in contact with the photovoltaic elements. This exchange zone has elements for disturbing the flow of a cooling fluid. In fact, this configuration requires very complex manufacture of the exchanger, but especially high cost. In addition, the exchanger is preferentially manufactured from metal (stainless steel), further increasing the cost as well as the weight of the panel.

The document EP 2284910 is also known, wherein the device proposed is composed of the photovoltaic module and a heat exchanger placed facing the rear face of said module. At least the top face of the exchanger is manufactured from plastics material, thus reducing the costs as well as the weight of the panel. The exchanger proposed includes a heat exchange zone disposed under the photovoltaic module and in which a cooling fluid flows. This fluid moves in internal channels extending from an inlet zone for the fluid as far as a discharge zone.

Finally, the documents WO 2008/003109 and the documents EP 3408869 and WO 2017/162993 in the name of the applicant are known. The latter hybrid panels have technical advantages, but the abilities thereof to cool the photovoltaic module can be improved, just like optionally that their ease of assembly and disassembly.

The present invention sets out to be applied or used with a heat pump so that the heat-transfer fluid, circulating in the heat exchanger of the hybrid solar panel, is colder than the air. Thus, in such systems, some of the heat is recovered from the air, which constitutes a thermal energy source.

In this context, the document WO 2018/033409 is known, which discloses a particularly expensive solution. The document EP 3270084 is also known, but assembling such a system is very complex since it is necessary first to install the extruded members, to connect them one by one, and then to install the photovoltaic module.

The invention sets out to remedy the drawbacks of the hybrid panels of the prior art.

In particular, one objective of the invention is to simplify the design of the exchangers for hybrid solar panels so as to reduce the costs of manufacturing and assembly.

Another objective of the invention is to propose a heat exchanger the configuration of which makes it possible to obtain optimised energy efficiency for operation as a glycolated water/water heat-pump cold source.

An additional objective of the invention is to improve the heat exchanges firstly between the heat exchanger and the ambient air, but also between the heat exchanger and the photovoltaic module. In other words, in the device according to the invention, the main objective is the loss in the air/heat-transfer fluid exchange and a secondary objective aims to cool the photovoltaic module in the heat-transfer fluid/photovoltaic module exchange.

Another objective of the invention is to be able to be installed on a roof, so that it is necessary to lighten the hybrid solar panel and to have space requirements compatible with roof-installation systems (also referred to as assembly systems) that are conventional in the photovoltaic sector.

Yet another objective of the invention lies in the fact that the hybrid solar panel must be able to be used as a cold source of a glycolated water/water heat pump, and in particular it is necessary to maintain a stable pressure, to reduce the pressure drops in the channels and to improve the homogeneity of the circulation of the fluid.

SUMMARY

It was thus found by the applicant, after various experiments and manipulations, that it was particularly advantageous to produce a heat exchanger incorporating a heat exchange zone contiguous with the photovoltaic module directly connected firstly to a heat-dissipating means and secondly to the conduits or portions of a conduit in which a heat-transfer fluid circulates, the heat exchange zone of the exchanger consisting of a single assembly in the form of a single-piece structure.

Thus the solution proposed by the invention relates to a hybrid solar panel including:

a photovoltaic module including a front face and a rear face, a heat exchanger, in particular for dissipating thermal energy coming from the photovoltaic module, including a bottom face and a top face, said top face being disposed facing the rear face of the photovoltaic module, the heat exchanger including at least one circulation pipe for transporting a heat-transfer fluid and two manifolds, one inlet and the other outlet, respectively for introducing and discharging the heat-transfer fluid circulating in the circulation pipe, a rigid frame framing the photovoltaic module and the heat exchanger, at least one elastic element adapted to exert a compression force against the bottom face of the exchanger so that said exchanger is pressed against the rear face of the photovoltaic module.

the elastic element bears against at least one support element, said support element being connected with the frame so that at least a part of the compression force exerted by the elastic element on the support element is absorbed by said frame, the support element is disposed under the exchanger and extends in the width and/or the length of said exchanger.

The method is remarkable in that the heat exchanger comprises at least one single-piece section resulting from extrusion, said section comprising a wall forming the aforementioned bottom and top faces of the heat exchanger, and in that said section includes:

a plurality of longitudinal fins extending substantially perpendicularly from the bottom face of the heat exchanger or from the aforementioned wall, and at least one portion of the circulation pipe directly connected to the bottom face of the heat exchanger or to the aforementioned wall, the portion of the circulation pipe extending substantially parallel to the longitudinal fins.

By virtue of the single-piece structure of the section, there is a heat exchange zone directly connecting-giving a particularly effective/improved heat dissipation by conduction—both the fins acting as heat sink and the pipes, or portions of pipes, for transporting a heat-transfer fluid.

From a point of view of assembling the hybrid solar panel according to the invention, this single-piece structure of the section affords the operators easy and rapid assembly and disassembly of the heat exchanger. This is because the heat exchange zone of the exchanger consists only of this single-piece section. Naturally the heat exchange zone of the exchanger conventionally consists of a plurality of single-piece sections and the operator merely has to change one or more of said sections to implement maintenance thereof.

Furthermore, this single-piece structure of the heat exchange zone confers on it particularly advantageous mechanical strength.

Advantageously, the thermal energy dissipating means (the fins) is distinct from the pipe, or portion of pipe, transporting the heat-transfer fluid. In other words, the pipe, or portion of pipe, is not positioned at a distance from the wall of the section (the pipe is here directly connected thereto), in particular envisaging this pipe or portion of pipe on or in the extension of the fins.

A particularly advantageous aspect of the invention lies in the modular appearance of the heat exchanger provided with this single-piece section, constituting by itself alone the heat exchange zone, including both the energy dissipating means and the pipe transporting the heat-transfer fluid. For reasons of simplification, the heat exchanger is conventionally composed of a plurality of single-piece sections up against each other to cover the heat exchange zone of a photovoltaic module. However, if it is necessary to replace all or part of the heat exchanger, in particular at the heat exchange zone thereof, it suffices to remove the support element and to replace the section or sections in question. This operation, because of the single-piece character of the section or modular character of the heat exchanger (the "heat exchange zone" module being reduced or limited to a single piece), is particularly easy and quickly implemented.

The expression "substantially perpendicular" means, in relation to the fins, the fact that the latter extend at 90°±15°

(i.e. forming an angle of between 75° et) 105° with respect to the wall (=heat exchange zone) of the section (also referred to as the bottom face of the heat exchanger), preferably 90°±5° (i.e. forming an angle of between 85° and) 95° with respect to the wall, even more preferably at 90° with respect to the wall of the section.

The expression "substantially parallel" means, in relation to the portion of pipe, or the pipe, with respect to the longitudinal fins, the fact that the extension angle between this pipe and these fins is between 0°±15°, preferably between 0°±5°, even more preferably by an angle of 0°.

The expression "heat-transfer fluid" means any type of fluid, with a liquid or gaseous base (or a mixture of the two, or even nanofluids consisting of nanometric metal particles in suspension), having physicochemical properties making it able to recover thermal energy in a heat exchange zone and then to restore it in a so-called release or dissipation zone. By way of non-limitative example, mention can be made, as examples, of water, glycolated water, or other heat-transfer fluids capable of being used in a hybrid panel according to the invention, halogenated fluids (two-phase "liquid-vapour"), gas of the carbon dioxide type (two-phase "liquid-solid"), aqueous solutions based on inorganic salts such as calcium chloride or potassium carbonate or aqueous solutions based on inorganic salts such as calcium chloride or potassium carbonate.

Hereinafter, the expression "photovoltaic module" refers to the part of the hybrid panel able to capture the energy coming from light rays for transformation thereof into electrical energy.

Expression "heat-transfer fluid" is equivalent to the expression "cooling fluid".

Further advantageous features of the apparatus that is the object of the invention are listed below. Each of these features may be considered alone or in combination with the remarkable features defined above. Each of these features contributes, where applicable, to solving specific technical problems defined earlier in the description and in which the remarkable features defined above are not necessarily involved. The latter may, where applicable, be the subject of one or more divisional patent applications.

Preferably, the wall of the section is interrupted and forms a square or rectangle.

In other words, the wall of the section or of the heat exchanger forming the heat exchange zone does not have any hole, aperture or cutout of any kind and advantageously has a form corresponding—at least partially when a plurality of sections are necessary for covering the heat exchange zone—to that of the photovoltaic module.

The form of the section is advantageously adapted to the junction boxes, i.e. to the locations of the latter, serving to recover the electrical energy supplied by the photovoltaic module. Optionally a cutout is produced in a section for accommodating the junction box or boxes.

Advantageously, the aforementioned single-piece section is made from aluminium.

Advantageously, the hybrid solar panel includes at least two support elements disposed under the exchanger, said support elements being in the form of bars installed at regular intervals in the length and/or width of said exchanger.

On FIG. 2, it is noted that there are five support elements advantageously secured to the rigid frame, but naturally a larger number of such support elements or on the contrary a smaller number, i.e. a single support element, can be envisaged according in particular to the dimensions of the heat exchange zone.

Preferably, the support elements consist of metal bars, advantageously made from aluminium, secured at the two opposite ends thereof to the rigid frame.

Advantageously, these aluminium metal bars consist of hollow sections, with a rectangular cross-section having at least two cross-sections, giving excellent mechanical strength, in particular low deflection under compression, while being particularly lightweight.

Such an embodiment of a support element is shown schematically by way of example on the accompanying FIG. 13.

Advantageously, the aforementioned manifolds are made from copper or aluminium, preferably aluminium. Should the manifolds be made from copper, galvanic isolation sleeves are used at the coupling. The advantage of using aluminium for producing the manifolds lies in particular in the absence of these galvanic sleeves.

Advantageously, the section comprises at least two portions of circulation pipe.

Provision can thus be made for the section to comprise three or even four or more portions of pipe, according to the inherent dimensions of the section.

Preferably, the aforementioned circulation pipe is secured to the manifolds by means of a coupling portion secured to said manifolds, said coupling portion also being secured to the circulation pipe, the attachments advantageously being mechanical, by force-fitting, and/or welded. Advantageously, the coupling portions secured to the manifolds and to the pipe are mechanically secured by force-fitting, with the supplementary aid of a gasket, or welded, or welded on one side (for example with the manifold) and mechanically force-fitted on the other (for example with the pipe).

Advantageously, the coupling portion is made from aluminium, brass or copper or an alloy based on copper and brass, or stainless steel. Once again, if this coupling is made from brass or copper whereas the section is made from aluminium, the coupling includes galvanic isolation—typically in the form of a sleeve—to protect from or against corrosion.

According to a first implementation of the invention, the coupling portion is angled so that the two manifolds are disposed so as to entirely lie outside the interior space formed by the aforementioned rigid frame, in other words these manifolds project beyond the plane containing the internal face of the rigid frame.

According to a second implementation of the invention, the coupling portion extends substantially linearly so that the two manifolds are disposed so as to entirely lie inside the interior space formed by the aforementioned rigid frame, in other words so as not to project beyond the plane containing the internal face of the rigid frame.

Advantageously, the aforementioned elastic element consists of a metal blade undulating in a Ω, advantageously mechanically secured pressed on against the wall of the section.

According to a possibility complementary or alternative to this so-called mechanical securing, provision can be made for this metal blade to have at least one glue (or glueing) point at one of the ends thereof.

Highly advantageously, the manifolds are connected to an inter-panel coupling module allowing coupling of the exchangers of a plurality of hybrid solar panels.

Advantageously, said panel comprises a plurality of elastic elements distributed in the length of each support element.

According to a preferred embodiment of the invention, the heat exchanger comprises a plurality of the aforementioned sections disposed alongside one another.

Advantageously, the elastic elements are distributed homogeneously over the entire surface of the bottom face of the exchanger.

Thus the wall of the section is perfectly kept constantly pressed against the rear face of the photovoltaic module.

BRIEF DESCRIPTION OF THE FIGURES

Further advantages and features of the invention will emerge more clearly on reading the description of a preferred embodiment hereinafter, with reference to the appended drawings, made by way of indicative and non-limiting examples and wherein:

FIG. 1 is a schematic representation in cross section of the various layers forming the photovoltaic module.

FIG. 2 is a schematic view from the rear of the hybrid solar panel on which support elements, elastic elements and the rigid frame can in particular be seen.

FIG. 3 is a schematic view in cross section, along the cross section of the plane B visible on FIG. 2, on which the interaction of the section according to the invention with a support element and the photovoltaic module can be seen.

FIG. 4 is a schematic view in cross section, along the cross section of the plane B visible on FIG. 2, on which only the heat exchanger according to the invention can be seen.

FIG. 5 is a schematic view on which the rear of the hybrid solar panel according to the invention can be seen.

FIG. 6 is a figure identical to FIG. 5 on which precisely the pipes or portions of pipe connecting on both sides the inlet and outlet or discharge manifolds can be seen.

FIG. 7 is a view of a portion of a section on which in particular a support element constraining three elastic elements acting under pressure on the bottom face of the section can be seen.

FIG. 8a is a schematic profile view of an elastic element according to the invention.

FIG. 8b is a schematic perspective view of an elastic element according to the invention.

FIG. 9 is a schematic view of a manifold, inlet or outlet, according to a first embodiment wherein angled couplings are provided for connecting said manifold to each pipe or portion of pipe of the heat exchanger.

FIG. 10 is a schematic view in cross section of an angled coupling according to this first embodiment.

FIG. 11 is a schematic view of a manifold, inlet or outlet, according to a second embodiment wherein linear couplings are provided for connecting said manifold to each pipe or portion of pipe of the heat exchanger.

FIG. 12 is a schematic view of an inter-panel coupling module for connecting a heat exchanger of a first panel to a heat exchanger of a second panel.

FIG. 13 is a schematic view in cross section of a support element.

FIG. 14 is a schematic representation of a variant embodiment of the single-piece section and of the fins extending over said section.

FIG. 15 is another representation of the variant illustrated on FIG. 14 wherein the fins are modified.

DETAILED DESCRIPTION OF THE EMBODIMENTS

The solar panel P that is the object of the invention is a hybrid panel, i.e. it is capable of simultaneously producing electrical energy and thermal energy. It is intended to be used alone or in combination with other similar panels, so that the electrical and thermal energy that it produces can be used by a dwelling or an energy system.

Referring in particular to FIGS. 1 to 3, the solar panel P includes a photovoltaic module 1 having a front face 12 and a rear face 11. The front face 12 is left free so that it can receive solar radiation. Approximately 80% of the solar energy received is dissipated in the panel P. The presence of a heat exchanger 2 placed facing the rear face 11 of the photovoltaic module 1 makes it possible to recover the heat accumulated or dissipated in the photovoltaic module 1.

On FIG. 1, the photovoltaic module 1 includes at least one, and advantageously a plurality of photovoltaic elements 1a placed in one and the same plane. These are electrically connected together, in series or in parallel, and are generally encapsulated, for example in a thermoplastic polymer 1b, 1c such as ethylene vinyl acetate (EVA) or silicone, to form the photovoltaic module 1. The front face 12 of the photovoltaic module 1 exposed to radiation is covered by a transparent sheet 1d, such as for example a sheet of glass.

A layer 1e of electrically insulating material called a "backsheet" is added to the rear face 11 of the photovoltaic module 1. This layer 1e fulfils, in addition to electrical insulation, a function of sealing between the photovoltaic module 1 and the heat exchanger 2. This layer 1e can, for example, be a film of polyvinyl fluoride or a sheet of glass, and prevents rain and/or moisture from the ambient air coming into direct contact with the photovoltaic module 1, thus preventing any electrical problem, such as for example false contacts or short-circuits.

If a non-metallic heat exchanger is envisaged, or at least the parts in contact with the photovoltaic module as non-metallic, it is however possible to omit the layer 1e of electrically insulating material. In this particular case, the rear face 11 is formed by the encapsulation layer 1b. The function of sealing and electrical insulation is then assumed by the heat exchanger 2, which then covers the entire surface of the photovoltaic module 1.

These various elements 1a, 1b, 1c, 1d, 1e are stacked in the form of a sandwich and are generally held together by the encapsulator, in general via cross-linking by a hot-rolling method.

The heat exchanger 2 is located under the photovoltaic module 1 so as not to form an obstacle to the solar radiation.

The exchanger is preferentially in direct contact with the backsheet. However, in the embodiment shown on FIG. 4, a layer 7 of viscous and/or malleable material is added and inserted between the rear face 11 of the photovoltaic module 1 and the top face 21a of the heat exchanger 2.

The use of a viscous and/or malleable material 7 makes it possible to keep the photovoltaic module 1 and the heat exchanger 2 in contact despite any deformation is of the latter, while preventing the presence of air between these two elements. The thickness of the layer 7 can vary from 0.1 mm to 1 cm (centimetre), preferably less than 1 mm, so as to have a fine layer 7 allowing heat to pass despite the fact of using a thermally insulating material. The material used is preferentially a gel, but may also be in the form of a viscoelastic material, a glue, a polymer, or any other form suiting a person skilled in the art.

The heat exchanger 2 includes three main zones: an inlet zone ZA for the cooling fluid, a heat exchange zone ZE and a zone ZV for discharging said fluid. The photovoltaic module 1 is preferentially positioned facing the exchange zone ZE but may also be located at least partially above the inlet ZA and discharge ZV zones. The exchange zone ZE may for example represent from 70% to 100%, preferentially at least 85% or even at least 95%, of the surface of the photovoltaic module 1.

The cooling fluid, which may consist typically of glycolated water, circulates in the heat exchanger 2 in order to recover the calories coming from the photovoltaic module 1. It is conveyed by means of a supply circuit and always circulates in the same direction in the exchanger 2, from the inlet zone ZA to the discharge zone ZV passing through the heat exchange zone ZE.

The heat exchanger 2 is composed of a rectangular, or even square, wall 33 and manifolds 3a, 3b. The manifolds 3a, 3b form respectively the inlet ZA and discharge ZV zones, whereas the exchange zone ZE is formed by the section or sections 30.

The hydraulic diameter of the manifolds 3a, 3b is advantageously greater than that of the pipes or portions of pipe 31 so that the pressure drop thereof is less than that of the pipes 31. Thus, when the cooling fluid arrives in the inlet zone ZA, it will first fill the latter before entering the pipes 31. Likewise, the fluid will be able to be discharged without constraint in the discharge zone ZV. The fluid will thus circulate in the pipes 31, homogeneously, without a preferential circuit and throughout the heat exchange zone ZE.

As illustrated on FIGS. 3 and 4, the heat exchanger 2 does not project beyond the plane C formed by the rigid square 6, i.e. the line or plane C joining the bottom lateral ends of the frame 6 on the side where the heat exchanger 2 is secured.

Thus the support element or elements 4 are secured at their opposite ends directly or indirectly to the rigid frame 6. This or these support elements 4 advantageously do not project beyond the plane or line C, in other words these support elements 4 to not protrude out of the frame 6.

If the panel P is considered as from the photovoltaic module 1 that is placed above all the other elements, the photovoltaic module 1 then optionally the layer 7 and then the heat exchanger 2 are found in this order. If only the heat exchanger 2 is considered, there are found above the wall 33 directly in contact with the layer 7 and/or the rear face 11 of the photovoltaic module 1, then the fins 32 and the pipe or portion of pipe 31, optionally one or more elastic elements 15 and finally the support element 4 that forces the elastic element or elements 15 to press the section 30 against the photovoltaic module 1 so that the exchange zone ZE is continuous.

FIGS. 4 to 6 also illustrate one or more junction boxes 40 intended to recover the electrical energy recovered or generated by the photovoltaic module 1. These junction boxes 40 are advantageously located at a distance in particular from the pipe or from the portion of pipe 31 so that there is no risk of contact between these boxes 40 and a pipe 31 in which a fluid is circulating.

One particularity of the hybrid solar panel according to the invention lies in the heat exchanger 2 and the modularity thereof, namely the fact that the heat exchange zone ZE of the heat exchanger 2 is formed by a single-piece section, resulting from extrusion, including both the pipe or portion of pipe 31 and the heat dissipating means, i.e. the fins 32. In doing this, the heat dissipating means 32, the wall 33 and the pipe or portion of pipe 31 form a single homogeneous assembly, made from a single material.

According to one interpretation, the heat exchanger 2 according to the invention is like a "harp" through the parallel alignment of the heat dissipating means 32 and the pipe 31 between the two manifolds 3a, 3b extending perpendicularly to said means 32 and to said pipe 31.

One important aspect of the heat exchanger 2 according to the invention lies in the mechanical nature of the thermal-energy dissipating means 32, i.e. this means 32 consists of a passive structural element not requiring any energy to be used. This thermal-energy dissipating means 32 operates essentially by thermal conduction through the material of the section 30.

FIG. 6 illustrates more precisely the path of the heat-transfer fluid in the pipe or portion of pipe 31. In this example embodiment, six sections 30 are necessary for covering the heat exchange zone ZE and each section 30 includes two pipes or portions of pipe 31. The junction boxes 40 are positioned or located between two sections 30, a space without wall 33 being dedicated to these junction boxes 40.

According to another formulation, one advantageous particularity of the invention lies in the fact that the pipes or portions of pipe 31 extend parallel to the thermal-energy dissipating means 32.

The support element 4 is advantageously secured to the rigid frame 6, either directly or indirectly via a fixed element connected to the frame 6. The latter solution illustrates the accompanying FIG. 7.

FIGS. 8a and 8b illustrate an implementation of the elastic element 15 consisting here of a blade substantially in an omega having a certain elasticity. This metal blade is advantageously metallic, for example consisting of a metal sheet, having a thickness of 1 mm to 10 mm, preferably from 1 mm to 3 mm. These strips or blades 15 thus include two relatively flat ends intended to come to rest on the bottom surface 21b of the wall 33 of the section 30. These blades or strips 15 advantageously have a width slightly less than the inter-fin space, i.e. the distance between two contiguous fins. Thus the prime function of these elastic elements 15 is to ensure, in cooperation with the support elements 4, the constant pressing of the heat-exchange wall 33 against the photovoltaic module 1.

These elastic elements 15 are advantageously forcibly inserted at at least one of their flat ends on the wall 33. This is because the elements 15 advantageously include lugs or protuberances 16 intended to come to be pressed against the fins 32. In doing this, the elastic element 15 is mechanically secured-without any other force—by simple contact or friction with or against the section 30. Advantageously, only one end of the elastic element 15 is thus secured with these lateral protuberances/lugs 16 so as to be able to deform elastically under the action of the support element.

These elastic elements 15 can otherwise be glued at at least one of the flat ends thereof on the wall 33 by means of a scotch or any other similar means allowing securing of the elastic element 15.

FIGS. 9 and 10 illustrate an implementation of the invention with regard to the production of the manifolds 3a, 3b and of the connections thereof with the pipes or proportions of pipe 31. On these two figures, the manifolds 3a, 3b are located outside the plane C defined by the bottom lateral limits of the rigid frame 6. Because of this, the connection between the pipes or portions of pipe 31 and the manifolds 3a, 3b consist of an angled coupling 35 forming an arc of a circle of about or approximately 90°.

This angled coupling 35 is firstly welded to the manifolds 3a, 3b and secondly secured by force-fitting to the end of the pipe or portion of pipe 31 of the section 30. A gasket provides the seal for this mechanical securing by force-fitting. The manifolds 3a, 3b are connected to an inter-panel coupling 50 for circulation of the heat-transfer fluid between all the heat exchangers 2 of the various panels P when the system comprises a plurality of panels P according to the invention.

In a version that is an alternative to the implementation shown on FIGS. 9 and 10, provision can also be made for the manifolds 3a, 3b to be present in the plane C or in other words not projecting outside this plane C. This embodiment is visible in FIG. 11.

In this implementation, the couplings 36 are linear, i.e. these couplings 36 extend linearly from one of the manifolds 3a or 3b as far as the end of a pipe or of a portion of pipe 31. Each manifold 3a, 3b includes at its two ends an angled end piece that makes it possible to connect said end of the manifolds 3a or 3b to the inter-panel coupling 50.

As illustrated on FIG. 13, the support element 4 advantageously consists of a hollow or void metal section. This support element 4 advantageously has a cross-section defining an eight or in other words two continuous rectangular cross sections. Such a configuration of the support element 4 confers thereon optimum mechanical strength so as not to project from this plane C despite the elastic compression stresses, great lightness and a certain elasticity. Advantageously, this support element 4 is made from aluminium.

FIGS. 14 and 15 illustrate a variant embodiment of the section 30. According to this variant, the section 30 comprises, apart from the wall 33, a closure counter-wall 60 to form circulation pipes 31 for the heat-transfer fluid. This closure counter-wall 60 extends from the wall 33, or in other words the wall 33 is extended by this closure counter-wall 60 so as to form a plurality of circulation pipes 31. Advantageously, each section 30 comprises over its entire width a plurality of circulation pipes 31, which enables the heat-transfer fluid to circulate in the immediate vicinity of the photovoltaic module 1, like the implementation shown on FIG. 7. Thus, in this variant, the heat-transfer fluid circulates over the entire cross-section of contact of the section 30 with the photovoltaic module 1, which further optimises the caloric/thermal exchanges between the photovoltaic module 1 and the heat-transfer fluid.

In this variant, as illustrated on these FIGS. 14 and 15, the fins 32 consist of elements with a linear section or forming a triangle or other polygon, or fins undulating or with offset. In the latter case, when the fins 32 have a triangular cross-section or in an accordion, the fins 32 are advantageously obtained independently of the wall 33 and of its closure counter-wall 60, but they 32 are then brazed or welded or assembled by other known techniques (glued, screwed, riveted, clinched, etc) to the latter 33, 60 so as to form a single-piece structure.

It should be noted that, in general terms, the section 30 is obtained, with its fins 32, in accordance with a manufacturing method in one step, either by extrusion or coextrusion, or then the single-piece section 30 is obtained by following two manufacturing/assembly steps: a first step of production by extrusion of a part of the wall 33, optionally of its closure counter-wall 60, and secondly of the fins 32, and then a second step of welding, brazing or other known mechanical/chemical assembly methods (glueing, screwing, riveting, clinching, etc) of the fins 32 to the wall 33 or its closure counter-wall 60. Solely in the context of the variant embodiment of the section 30 shown on FIGS. 14 and 15, more particularly in the case of FIG. 15, it can optionally be envisaged, in place of an extrusion or coextrusion, the manufacture or the obtaining of the fins 32 by rolling, drawing and/or bending, these next being welded/brazed/assembled on the closure counter-wall 60. In the latter case, the section 30 is essentially obtained by extrusion and, once the fins 32 have been welded/brazed/assembled on the closure counter-wall 60, the section 30 in its totality (wall 33, closure counter-wall 60 and fins 32) does indeed form a single-piece assembly.

It should also be noted here that, in the context of the present invention, the expression "extending from the wall 33" in relation to the fins 32 means, solely for this variant embodiment of the section 30 shown on FIGS. 14 and 15, by means of the closure counter-wall 60 prolonging or extending from the wall 33. In other words, specifically in this embodiment, the fins 32 extend indirectly from the wall 33, i.e. via the closure counter-wall 60.

Although the invention has been described in connection with several particular embodiments, it is obvious that it is in no way limited thereto and that it comprises all of the technical equivalents of the described means as well as their combinations if these fall within the scope of the invention.

The arrangement of the various elements and/or means and/or steps of the invention, in the embodiments described above, should not be understood as requiring such an arrangement in all the implementations. In any case, it will be understood that various modifications may be made to these elements and/or means and/or steps, without deviating from the spirit and the scope of the invention. In particular:

There may or may not be a layer 7, preferably without the layer 7, between the photovoltaic module and the heat exchanger 2, the wall 33 of the section 30 has a thickness of between 0.3 mm (millimetres) and 8 mm, preferably between 0.5 mm and 3 mm, the elastic elements 15 for pressing the wall 33 against the photovoltaic module 1 may be different from those mentioned above, both in form, in nature and in dimensions, in the photovoltaic module 1, the glass 1*d* may be replaced by a material called "frontsheet", transparent, flexible, resistant to ultraviolet, based for example on fluoropropylene such as tetrafluoroethylene or ETFE, the layers 1*b*, 1*c* of encapsulating material are not necessarily the same, or even may not exist.

The use of the verb "include", "comprise" or "contain" and of its conjugated forms does not exclude the presence of other elements or other steps than those set out in a claim.

In the claims, any reference sign between parentheses should not be interpreted as a limitation of the claim.

The invention claimed is:

1. A hybrid solar panel comprising:
a photovoltaic module including a front face and a rear face,
a heat exchanger configured for dissipating thermal energy coming from the photovoltaic module, including a bottom face and a top face, said top face disposed facing the rear face of the photovoltaic module, the heat exchanger further including at least one circulation pipe configured for transporting a heat-transfer fluid and two manifolds, namely an inlet manifold and an outlet manifold, respectively for introducing and discharging the heat-transfer fluid circulating in the circulation pipe,
a rigid frame framing the photovoltaic module and the heat exchanger,
at least one elastic element adapted to exert a compression force against the bottom face of the exchanger so that said exchanger is pressed against the rear face of the photovoltaic module,

the elastic element pushes against at least one support element, said support element connected with the frame so that at least a part of the compression force exerted by the elastic element on the support element is absorbed by said frame,
the support element is disposed under the exchanger and extends along a width and/or a length of said exchanger,
wherein that the heat exchanger comprises at least one single-piece section resulting from extrusion, said section comprising a wall forming the aforementioned bottom and top faces of the heat exchanger, and said section includes:
a plurality of longitudinal fins extending substantially perpendicularly from the aforementioned wall, and
at least one portion of the circulation pipe directly connected to the aforementioned wall, the portion of the circulation pipe extending substantially parallel to the longitudinal fins.

2. The hybrid solar panel according to claim 1, wherein the wall of the section is interrupted and forms a square or rectangle.

3. The hybrid solar panel according to claim 1, wherein the wall of the section is extended by a closure counter-wall so as to define a plurality of circulation pipe portions.

4. The hybrid solar panel according to claim 1, wherein the aforementioned single-piece section is made from aluminium.

5. The hybrid solar panel according to claim 1, wherein the aforementioned manifolds are made from copper or aluminium.

6. The hybrid solar panel according to claim 1, wherein the section comprises at least two circulation pipe portions.

7. The hybrid solar panel according to claim 6, wherein the coupling portion is made from aluminium, brass or copper or an alloy based on copper and brass, or stainless steel.

8. The hybrid solar panel according to claim 6, wherein the coupling portion is angled so that the two manifolds are disposed so as to entirely lie outside an interior space formed by the aforementioned rigid frame, and the two manifolds project beyond a plane containing an internal face of the rigid frame.

9. The hybrid solar panel according to claim 6, wherein the coupling portion extends substantially linearly so that the two manifolds are disposed so as to entirely lie inside an interior space formed by the aforementioned rigid frame, so as not to project beyond a plane containing an internal face of the rigid frame.

10. The hybrid solar panel according to claim 1, wherein the aforementioned elastic element consists of a metal blade undulating in an $\Omega$ shape, and mechanically secured pressed on or against the wall of the section.

11. The hybrid solar panel according to claim 1, wherein the manifolds are connected to an inter-panel coupling module allowing coupling of the exchangers of a plurality of hybrid solar panels.

12. The hybrid solar panel according to claim 1, wherein said panel comprises a plurality of elastic elements distributed along a length of each support element.

13. The hybrid solar panel according to claim 1, wherein the heat exchanger comprises a plurality of aforementioned sections disposed alongside one another.

* * * * *